May 20, 1941.        G. WÜNSCH        2,242,806
GYROSCOPE
Filed Feb. 9, 1938        2 Sheets-Sheet 1

Inventor:
Guido Wünsch

Patented May 20, 1941

2,242,806

UNITED STATES PATENT OFFICE 2,242,806

GYROSCOPE

Guido Wünsch, Berlin-Steglitz, Germany, assignor to Askania-Werke A. G. vormals Centralwerkstatt-Dessau und Carl Bamberg-Friedenau, a corporation of Germany Application February 9, 1938, Serial No. 189,664
In Germany February 9, 1937

11 Claims. (Cl. 74—5)

This invention relates to improvements in gyroscopes in which the spinning axis is maintained in a predetermined relation with respect to the true vertical. This class of gyroscopes is represented, for example, by the well-known gyro vertical, a gyroscope having three degrees of freedom and including a rotor spinning about a vertical axis. Another representative of the aforementioned class is the directional gyroscope including a rotor spinning about a horizontal axis and mounted for movement about two axes normal to each other and to the axis of spin. The latter type of instrument serves for indicating directions in azimuth and is also capable of establishing a true horizontal direction normally maintained by the axis of spin.

It is a widely used practice to equip gyroscopic instruments of the aforementioned class with gravity controlled devices for exerting on the gyroscope correcting torques for preventing a deviation of the gyro spin axis from its proper direction.

When a gyroscope equipped with a gravity controlled device for exerting correcting torques on the same is acted upon by horizontal accelerations, such as occur, for example, on aircraft when flying in a curve, the gravity controlled device has the tendency of responding to the direction of the apparent rather than the true vertical, thereby causing the rotor spin axis to assume an improper direction.

It has been suggested for overcoming this disadvantage to render the gravity controlled correcting device inoperative during periods in which disturbing influences would cause the correcting device to apply improper torques to the gyroscope. The gyroscope during this time maintains its former position precessing only slowly into an improper direction on account of unavoidable unbalance or friction in the bearings.

Many types of gyroscopes are equipped with pneumatic gravity controlled correcting devices in which, for example, air reaction torques are exerted on the rotor bearing member produced by air jets issued from the same and directed against the surrounding air. The air used for this purpose may be air discharged from the rotor bearing casing and previously be used for driving the rotor or may be air compressed by the centrifugal action of the spinning rotor driven by any other suitable source, as is well-known in the art.

It is extremely difficult to render inoperative devices of the pneumatic type for exerting correcting torques on a gyroscope. In an all-pneumatic gyroscope, for example, an interruption of the supply of air would also stop the gyro rotor. For rendering inoperative, on the other hand, the pneumatic torque applying device proper a very complicated mechanism on the rotor bearing member would be required.

It is accordingly an object of this invention to provide in a gyroscope equipped with a gravity controlled correction device simple and reliable means for preventing an improper action of the correcting device caused by disturbing influences. According to this invention additional torques are exerted on the gyroscope counteracting the torques exerted by the correcting device and controlled in response to outside disturbing influences acting on the gyroscope.

Aims, objects, and advantages of this invention will appear from a consideration of the description and the accompanying drawings showing for purely illustrative purposes embodiments of this invention. It is to be understood, however, that the description is not to be taken in a limiting sense, the scope of this invention being defined in the appended claims.

Referring to the drawings.

Figure 1:
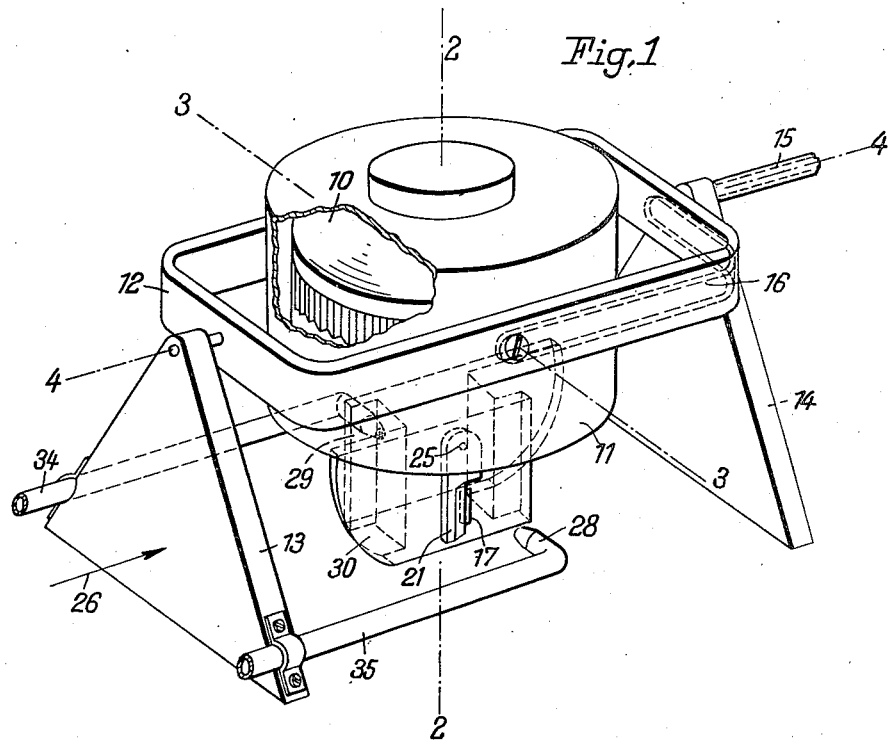
Fig. 1 is a perspective illustration of one form of the invention.

In Fig. 1 the invention is shown as applied to a gyro vertical. A gyro rotor 10 is mounted in a rotor bearing member or casing 11 for spinning about a vertical axis 2—2. The rotor bearing casing is pivoted in a gimbal ring 12 for movement about an axis 3—3, the gimbal ring being mounted for oscillations about an axis 4—4 in standards 13 and 14.

Air for driving the rotor is supplied to the instrument through a pipe 15 communicating with a hollow passage 16 in the gimbal ring and admitted to the driving nozzle (not shown) in the interior of the rotor casing through a hollow bearing of the axis 3—3.

Used air is discharged from the rotor bearing casing through ports 17, 18, 19, and 20. The discharge of air through the ports is controlled by gravity responsive means shown in the illustrated embodiment as being pendulous shutters 21, 22, 23, and 24 normally permitting air jets of equal force to issue through all of the ports. The axis about which the shutter 21 is permitted to oscillate is indicated at 25, it being understood that similar pivotal suspensions are provided for each one of the shutters.

When an inclination of the rotor casing about the axis 3—3 occurs in a clockwise direction, the shutter 21 will tend to close the port 17, while the opposite shutter 23 will open the port 19, thereby causing an unbalance of the torques about the axis 4—4 resulting in a precessional movement of the gyroscope about the axis 3—3 into its proper position in which the spin axis 2—2 is aligned with the true vertical and the shutters permit reaction jets of equal magnitude to issue in all four directions.

When an acceleration in the direction of the arrow 26 acts on the gyroscope, caused, for example, by a centrifugal force acting on an airplane on which the gyroscope is mounted during a curve, the shutters 21 and 23 will be moved irrespective of the fact that the gyro spin axis 2—2 may be in the proper position aligned with the true vertical. Accordingly, air reaction torques will be exerted again on the gyroscope acting from the gyroscope in the direction of the arrow 27 causing the gyroscope to precess about the axis 3—3 until the spin axis aligns itself with the apparent vertical.

For preventing such improper movements torque applying devices are provided for counteracting the gravity controlled correcting devices of the gyroscope. In the illustrated example of Fig. 1 which may be assumed to be a gyro vertical mounted on board aircraft with the axis 3—3 parallel to the longitudinal axis of the craft the torque applying device comprises a pair of nozzles 28 and 29 directed against surfaces or vanes 30 and 31 of the rotor casing.

Air is supplied to the nozzles through a supply conduit 32 connected to a control valve 33 controlling conduits 34 and 35.

For detecting disturbing influences acting on the gyroscope a turn responsive gyroscope is shown in the illustrated embodiment and comprising a rotor 36 rotatable about an axis 6—6 in a rotor bearing frame 37, the rotor bearing frame being mounted for movement about an axis 5—5 in bearings 38 and 39 on the craft. The rotor axis of the turn responsive gyroscope is biased towards a normal position in which the spin axis 6—6 is horizontal by means of springs 40 and 41 connected to the bearing 39 and an arm 42 on the rotor bearing frame, respectively. The arm 42 is connected through a link 43 to the movable member of the control valve 33 for controlling the supply of compressed air to the nozzles 28 and 29 for exerting torques on the gyroscope in response to turning movements of the craft during which centrifugal forces will act on the gyro vertical. For preventing undue oscillations of the turn responsive gyroscope a dampening device may be provided shown in the illustrated embodiment as being a cylinder 44 having a bleeder hole 45 and a piston 46 movable in the cylinder and connected to the link 43 by means of a link 47.

Figure 2:
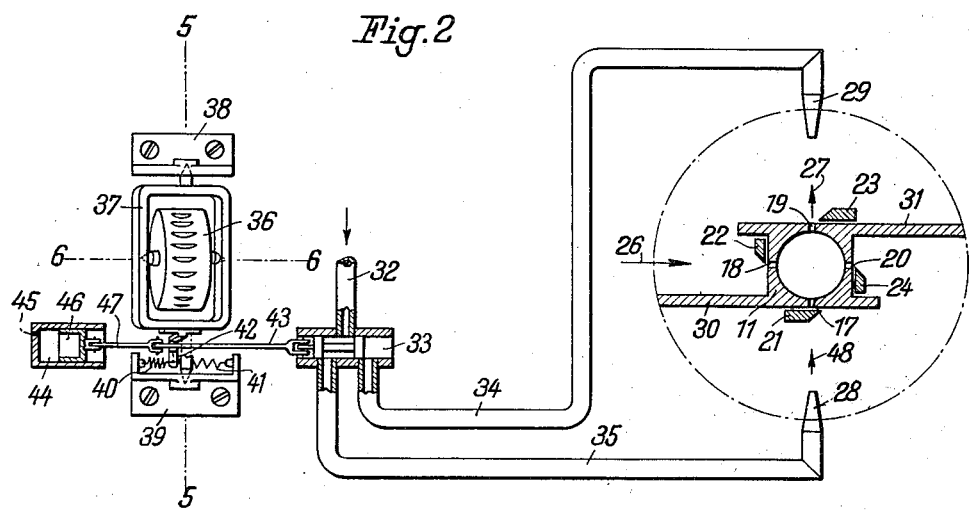
Fig. 2 is a diagrammatic view, partly in section, of one form of my control device for use in connection with the instrument shown in Fig. 1.

The operation of the device is as follows:

When the aircraft makes a turn in azimuth, the turn responsive gyroscope will precess about the axis 5—5, thereby actuating the valve 33 and causing compressed air to be supplied to one of the nozzles 28 and 29. Assuming, for example, that the plane makes a left turn causing a centrifugal force to act on the gyro vertical in the direction of the arrow 26 and assuming a direction of precession of the turn responsive gyroscope as shown in Fig. 2, compressed air will be supplied to the nozzle 28 acting on the gyro vertical in the direction of the arrow 48 counteracting the air jet issued from the port 19 which tends to move the rotor casing 11 towards the nozzle 28. As the centrifugal force usually will cause a movement of the pendulous shutters into their extreme positions in which one port is entirely closed and the opposite port entirely opened, it is advantageous to make the counteracting force exerted by the nozzle 28 or 29 equal to the reaction force exerted by one port.

Figure 3:
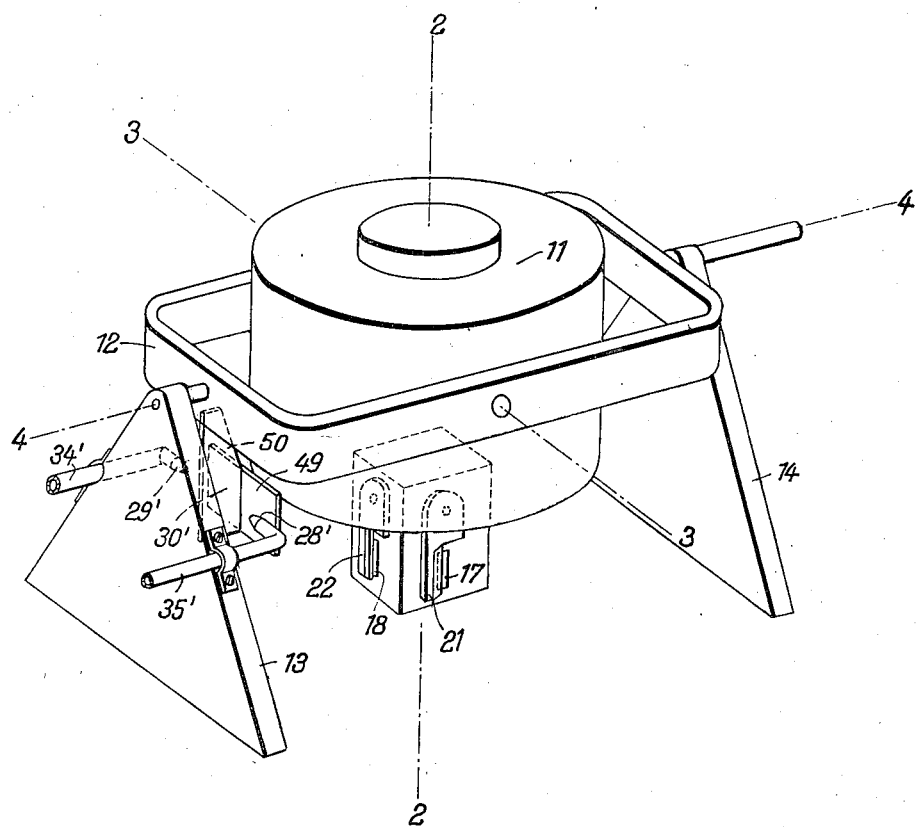
Fig. 3 is a perspective illustration of another form of the invention.

Another embodiment of the invention is shown in Fig. 3 in which like reference numerals are used for designating like parts.

In Fig. 3 the rotor casing 11 is shown in its conventional form without reaction surfaces 30 and 31. For applying torques on the gyroscope about the axis 4—4 in opposition to torques exerted by ports 17 and 19 controlled by shutters 21 and 23, respectively, a pair of nozzles 28' and 29' is provided supplied with air through conduits 34' and 35' and directed against a vane 30' secured to the gimbal ring 12. In order to prevent air jets deflected from the vane 30' from acting on the rotor casing additional shielding vanes 49 and 50 may be secured to the vane 30'.

The operation of the device shown in Fig. 3 is in all respects identical with that of Figs. 1 and 2.

Obviously the present invention is not restricted to the particular embodiments herein shown and described. Other forms of torques applying devices may be used depending upon the particular form of the gyroscopic instrument.

What is claimed is:

1. A gyroscope comprising, in combination, a gimbal ring mounted on a support for movement about a first axis; a rotor bearing member mounted on said gimbal ring for movement about a second axis normal to said first axis; a gyro rotor mounted on said bearing member for spinning about a third axis normal to said second axis; a source of power for applying erecting torques on said gyroscope, gravity controlled means for controlling the application of said source of power to maintain said third axis in a predetermined relation with the vertical; and means responsive to turning movements of said support for exerting a torque counteracting said gravity controlled torque during such turn, thereby preventing said last named torque from causing said rotor to follow the direction of the apparent vertical during protracted turns.

2. A gyroscope comprising, in combination, a gimbal ring mounted on a support for movement about a first axis; a rotor bearing member mounted on said gimbal ring for movement about a second axis normal to said first axis; a gyro rotor mounted on said bearing member for spinning about a third axis normal to said second axis; force exerting means arranged to exert on said bearing member a torque about one of said first and second axes, thereby causing precession about the other axis; gravity responsive means arranged to control said force exerting means; and means responsive to turning movements of said support for exerting a force counteracting the force exerted by said other means, whereby a precession of the gyroscope caused by an actuation of said gravity responsive means by centrifugal force will be prevented during protracted turns.

3. A gyroscope comprising, in combination, a gimbal ring mounted on a support for movement about a first axis; a rotor bearing member mounted on said gimbal ring for movement about a secaxis normal to said first axis; a gyro rotor mounted on said bearing member for spinning about a third axis normal to said second axis; first force exerting means arranged to exert on said bearing member a torque about one of said first and second axes, thereby causing precession about the other axis; gravity responsive means arranged to control said first force exerting means; second force exerting means arranged to exert on said bearing member a torque opposed to the torque of said first force exerting means; and means responsive to turning movements of said support and connected to control said second force exerting means, whereby a precession of the gyroscope caused by an actuation of said gravity responsive means by centrifugal force will be prevented during protracted turns.

4. A gyro-vertical comprising, in combination, a gimbal ring mounted on a support for movement about a first axis; a rotor bearing member mounted on said gimbal ring for movement about a second axis normal to said first axis; a gyro rotor mounted on said bearing member for spinning about a third axis normal to said second axis; first means including ports on said bearing member for issuing jets of air, thereby creating a torque about one of said first and second axes and causing precession about the other axis; gravity responsive means adjacent said ports for controlling the discharge of air through said ports; second means including air nozzles adapted to exert on said bearing member a torque opposed to the torque created by said first means; a turn responsive gyroscope and means controlled thereby for governing the discharge of air through said nozzles, whereby a precession of the gyro-vertical otherwise caused by an actuation of said gravity responsive means by centrifugal force will be prevented during protracted turns.

5. A gyro-vertical comprising, in combination, a gimbal ring mounted on a support for movement about a first axis; a rotor bearing member mounted on said gimbal ring for movement about a second axis normal to said first axis; a gyro rotor mounted on said bearing member for spinning about a third axis normal to said second axis; first means including ports on said bearing member for issuing jets of air, thereby creating a torque about one of said first and second axes and causing precession about the other axis; gravity responsive means adjacent said ports for controlling the discharge of air through said ports; a vane on said bearing member; a pair of nozzles adapted to discharge jets of air against said vane for exerting torques on said member opposed to the torque by said first means; a turn responsive gyroscope and means controlled thereby for governing the discharge of air through said nozzles, whereby a precession of the gyroscope caused by an actuation of said gravity responsive means by centrifugal force will be prevented during protracted turns.

6. Gyroscopic apparatus comprising, in combination, an instrument support; a gimbal ring mounted on said support for movement about a first axis; a rotor bearing member mounted on said gimbal ring for movement about a second axis normal to said first axis; a gyro rotor mounted on said bearing member for spinning about a third axis normal to said second axis; first means including ports on said bearing member for issuing jets of air, thereby creating a torque about one of said first and second axes and causing precession about the other axis; gravity responsive means arranged to control the discharge of air through said ports; a vane on said gimbal ring; a pair of nozzles arranged to discharge jets of air against said vane for exerting torques on said member opposed to the torque by said first means; and a turn responsive gyroscope connected to control the discharge of air through said nozzles, whereby a precession of the gyroscope caused by an actuation of said gravity responsive means by centrifugal force will be prevented during protracted turns.

7. Gyroscopic apparatus for use on craft comprising, in combination, a gimbal ring mounted on said craft for movement about a first axis; a rotor bearing member mounted on said gimbal ring for movement about a second axis normal to said first axis; a gyro rotor mounted on said bearing member for spinning about a third axis normal to said second axis; first force exerting means arranged to exert on said bearing member a torque about one of said first and second axes, thereby causing precession about the other axis; gravity responsive means on said gyroscope for controlling said first force exerting means upon relative tilt of said gyroscope and said means; second force exerting means fixed on the craft and adapted to exert on said bearing member a torque opposed to the torque of said first force exerting means; and a second gyroscope responsive to turning of the craft in azimuth, and means controlled thereby for governing said second force exerting means, whereby a precession of the gyroscope caused by an actuation of said gravity responsive means by centrifugal force will be prevented during protracted curves.

8. Gyro-vertical for use on craft comprising, in combination, a gimbal ring mounted on said craft for movement about a substantially horizontal first axis; a rotor bearing member mounted in said gimbal ring about a second substantially horizontal axis normal to said first axis; a gyro rotor mounted on said bearing member for spinning about a third substantially vertical axis; first means including ports on said bearing member for issuing jets of air, thereby creating a torque about one of said horizontal axes to cause precession about the other horizontal axis; gravity responsive means adjacent said ports to control the discharge of air through said ports; second means including air nozzles fixed on the craft and adapted to exert on said bearing member a torque opposed to the torque created by said first means; and a second gyroscope responsive to turning movements of the craft in azimuth, and means operated thereby to control said second means, whereby a precession of the gyroscope caused by an actuation of said gravity responsive means by centrifugal force will be prevented during protracted curves.

9. The combination with a gyroscope including a support, a gyro rotor, means for mounting said rotor for spinning about an axis and for universal movement relatively to said support, first force exerting means arranged to exert on said rotor a torque about an axis at an angle to the spinning axis, thereby causing precession of the rotor, gravity responsive means on said gyroscope for controlling said first force exerting means, a second normally inoperative force exerting means on said support for intermittently counteracting said first means; and means responsive to turning movements for bringing said second force into action, whereby a precession of the gyroscope caused by an actuation of said gravity responsive means by centrifugal force will be prevented during protracted turns.

10. In a gyro-vertical having fore and aft and lateral axes of support, two gravitationally responsive means for causing a torque to be exerted about either of said axes upon relative tilt of the gyro and one of said gravitational means about the other axis, and means brought into action by a turning of the craft in azimuth for eliminating only that effective torque caused to be exerted by the gravitational means which is affected by the turn but leaving the torque caused to be exerted by the other gravitational means unaffected.

11. In a gyro-vertical having fore and aft and lateral axes of support, a gravitationally controlled erection device thereon for maintaining the gyroscope vertical, normally inoperative oppositely facing nozzles mounted independently of said gyroscope and on each side of said fore and aft axis and each of which is adapted, when energized, to blow a jet of air in one direction or the other on the gyroscope, turn responsive means for detecting the start and direction of a turn, and means operated thereby for bringing the proper jet into action upon turn of the craft in either direction for preventing precession of the gyroscope that would otherwise occur due to said gravitational erection device.

GUIDO WÜNSCH.